(12) United States Patent
Kubert et al.

(10) Patent No.: US 6,561,416 B2
(45) Date of Patent: May 13, 2003

(54) DEBIT CARD HAVING SECURE SCRATCH-OFF LABEL STRIP AND METHOD OF APPLYING SAME

(75) Inventors: Vincent Kubert, Melbourne, FL (US); Andrew Spooner, Ijsselstein (NL)

(73) Assignee: Profold, Inc., Sebastian, FL (US)

( * ) Notice: Subject to any disclaimer, the term of this patent is extended or adjusted under 35 U.S.C. 154(b) by 0 days.

(21) Appl. No.: 09/772,566

(22) Filed: Jan. 30, 2001

(65) Prior Publication Data

US 2001/0023895 A1 Sep. 27, 2001

Related U.S. Application Data

(63) Continuation-in-part of application No. 09/496,096, filed on Feb. 1, 2000, now Pat. No. 6,199,757.

(51) Int. Cl.[7] ................................................ G06F 17/00
(52) U.S. Cl. ...................................... 235/375; 235/487
(58) Field of Search ................................ 235/375, 487

(56) References Cited

U.S. PATENT DOCUMENTS

| | | |
|---|---|---|
| 2,145,334 A | 1/1939 | Bergstein |
| 2,781,818 A | 2/1957 | Beckman et al. |
| 3,966,193 A | 6/1976 | Storace et al. |
| 4,119,194 A | 10/1978 | Freeman et al. |
| 4,121,403 A | 10/1978 | Bogdanski et al. |
| 4,140,627 A | 2/1979 | Weller et al. |
| 4,183,779 A | 1/1980 | Barber et al. |
| 4,278,488 A | 7/1981 | Kopacz et al. |
| 4,588,463 A | 5/1986 | Barber et al. |
| 4,606,715 A | 8/1986 | Larson |
| 4,621,798 A | 11/1986 | Akers |
| 4,669,719 A | 6/1987 | Frantangelo |
| 4,701,238 A | 10/1987 | Boucher |
| 4,738,473 A | 4/1988 | Meloni et al. |
| 4,750,966 A | 6/1988 | Koller |
| 4,787,950 A | 11/1988 | Meloni et al. |
| 4,795,042 A | 1/1989 | Klein et al. |
| 4,930,764 A | 6/1990 | Holbrook et al. |
| 4,955,483 A | 9/1990 | O'Dea et al. |
| 4,971,686 A | 11/1990 | O'Dea et al. |
| 4,973,037 A | 11/1990 | Holbrook |
| 5,114,137 A | 5/1992 | Olson |
| 5,214,901 A | 6/1993 | Milliner |
| 5,294,100 A | 3/1994 | Scheibelhut |
| 5,393,366 A | 2/1995 | Bell |
| 5,398,922 A | 3/1995 | Malatesta |

(List continued on next page.)

FOREIGN PATENT DOCUMENTS

| | | |
|---|---|---|
| EP | 0 326 724 | 8/1989 |
| EP | 0 896 296 | 2/1999 |
| FR | 2 780 339 | 12/1999 |
| WO | WO 99/16566 | 4/1999 |

OTHER PUBLICATIONS

Patent Abstracts of Japan, vol. 1998, No. 13, Nov. 30, 1998, and JP 10 214320A (Dainippon Printing Co., Ltd.), Aug. 11, 1998, one page.

Patent Abstracts of Japan, vol. 1996, No. 11, Nov. 29, 1996, and JP 08 192593A (Dainippon Printing Co., Ltd.), Jul. 30, 1996, one page.

*Primary Examiner*—Harold I. Pitts
(74) *Attorney, Agent, or Firm*—Allen, Dyer, Doppelt, Milbrath & Gilchrist, P.A.

(57) ABSTRACT

A telephone calling card or debit card is formed as a planar card member having front and rear surfaces. A scratch-off label strip is adhered to one of the surfaces and includes an opaque label strip applied onto the surface of the card. A PIN code is applied onto the opaque label strip. A scratch-off layer is applied over the opaque label strip and over the PIN code to obscure from viewing the PIN code. The scratch-off layer can be included on a second label strip applied onto the opaque label strip for covering at least the PIN code.

33 Claims, 15 Drawing Sheets

U.S. PATENT DOCUMENTS

| | | |
|---|---|---|
| 5,504,808 A | 4/1996 | Hamrick, Jr. |
| 5,595,044 A | 1/1997 | Kataigi |
| 5,629,977 A | 5/1997 | Fonseca |
| 5,630,899 A | 5/1997 | Meschi |
| 5,640,447 A | 6/1997 | Fonseca |
| 5,673,309 A | 9/1997 | Woynoski et al. |
| 5,891,300 A | 4/1999 | Oussani, Jr. et al. |
| 5,918,909 A | 7/1999 | Fiala et al. |
| 6,028,920 A | 2/2000 | Carson |
| 6,173,901 B1 | 1/2001 | McCannel |
| 6,199,757 B1 * | 3/2001 | Kubert ........................ 235/380 |

* cited by examiner

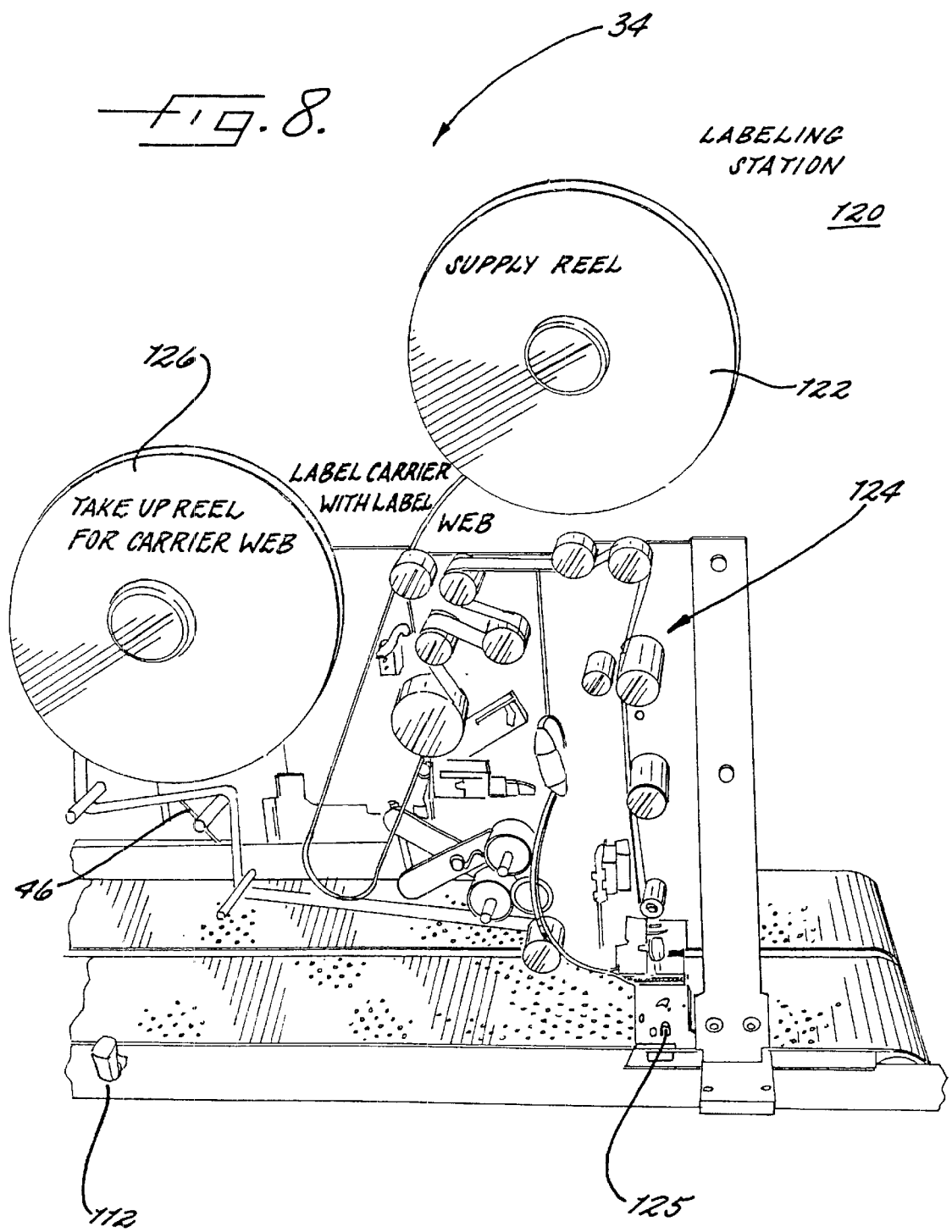

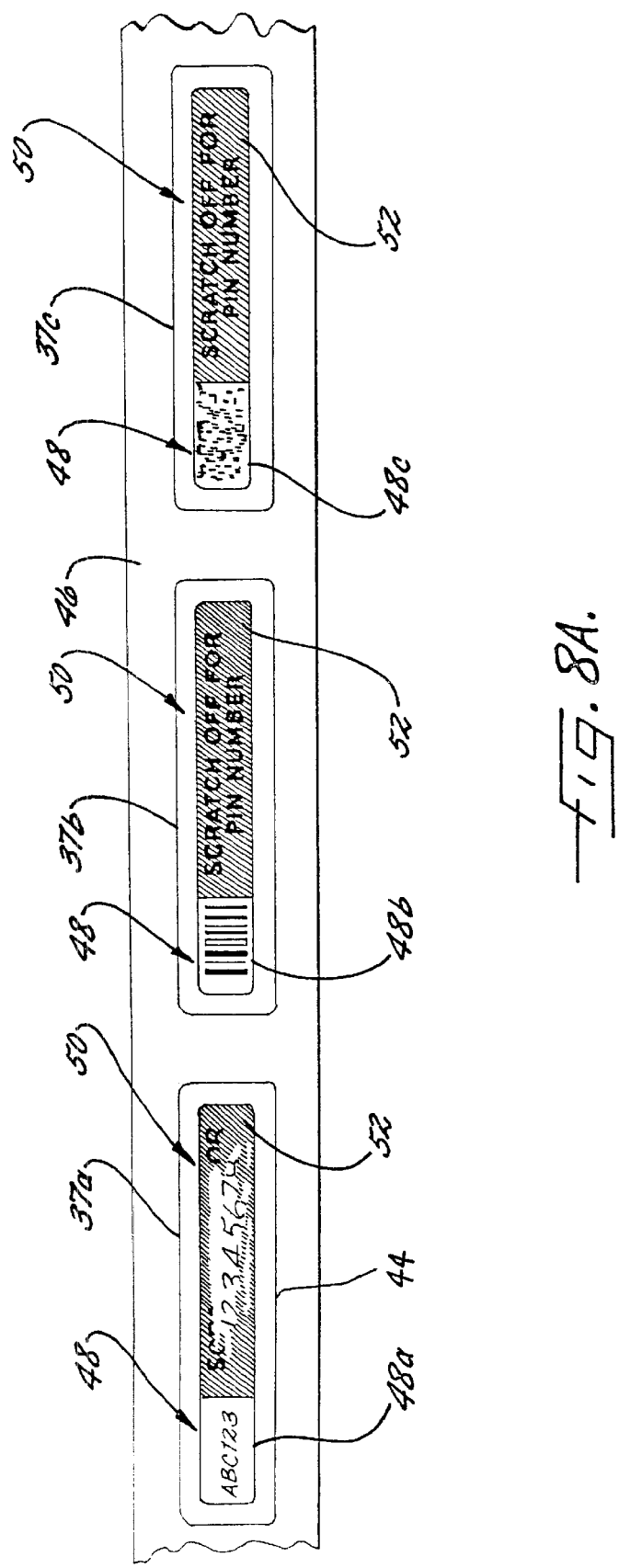

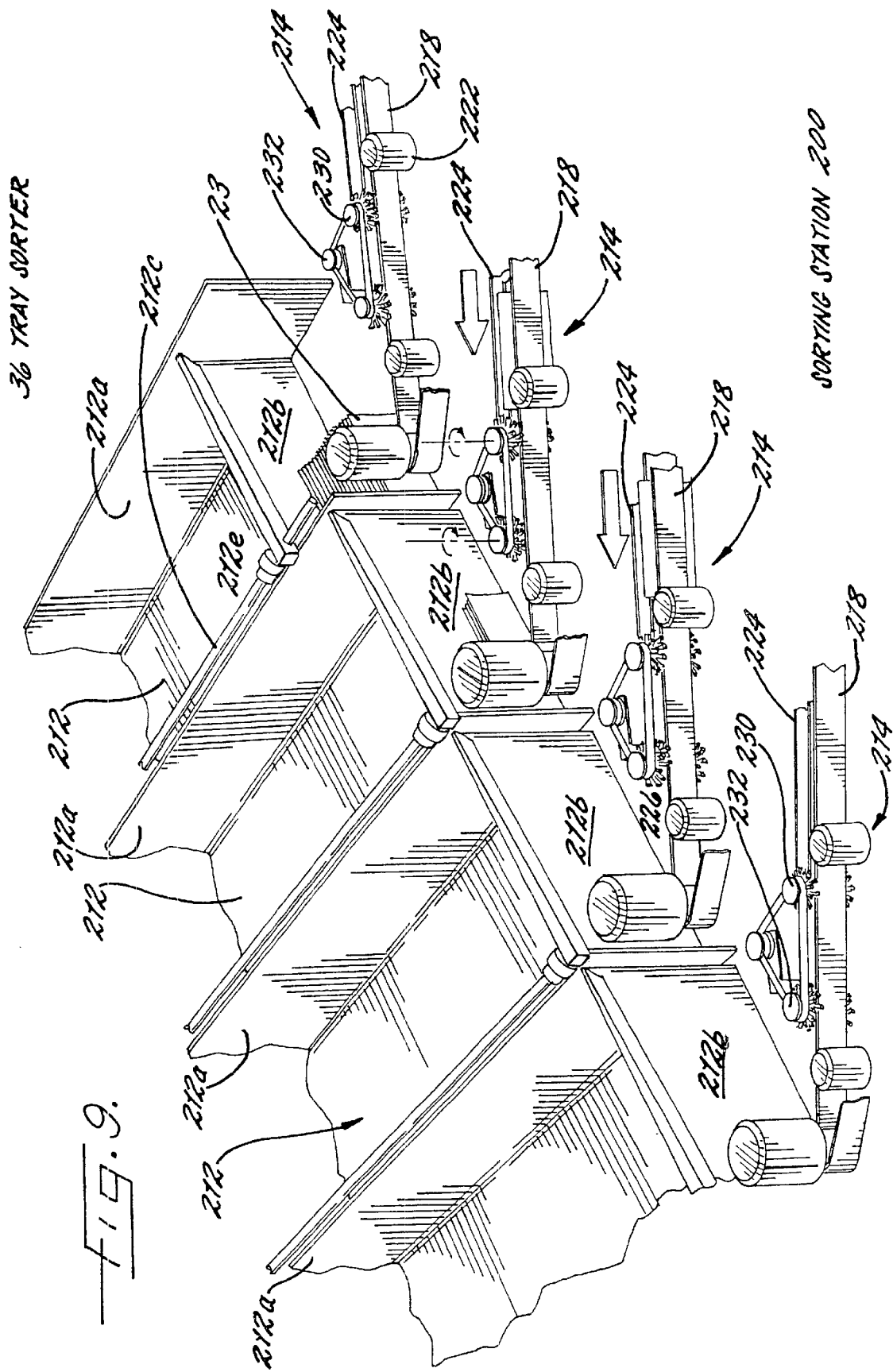

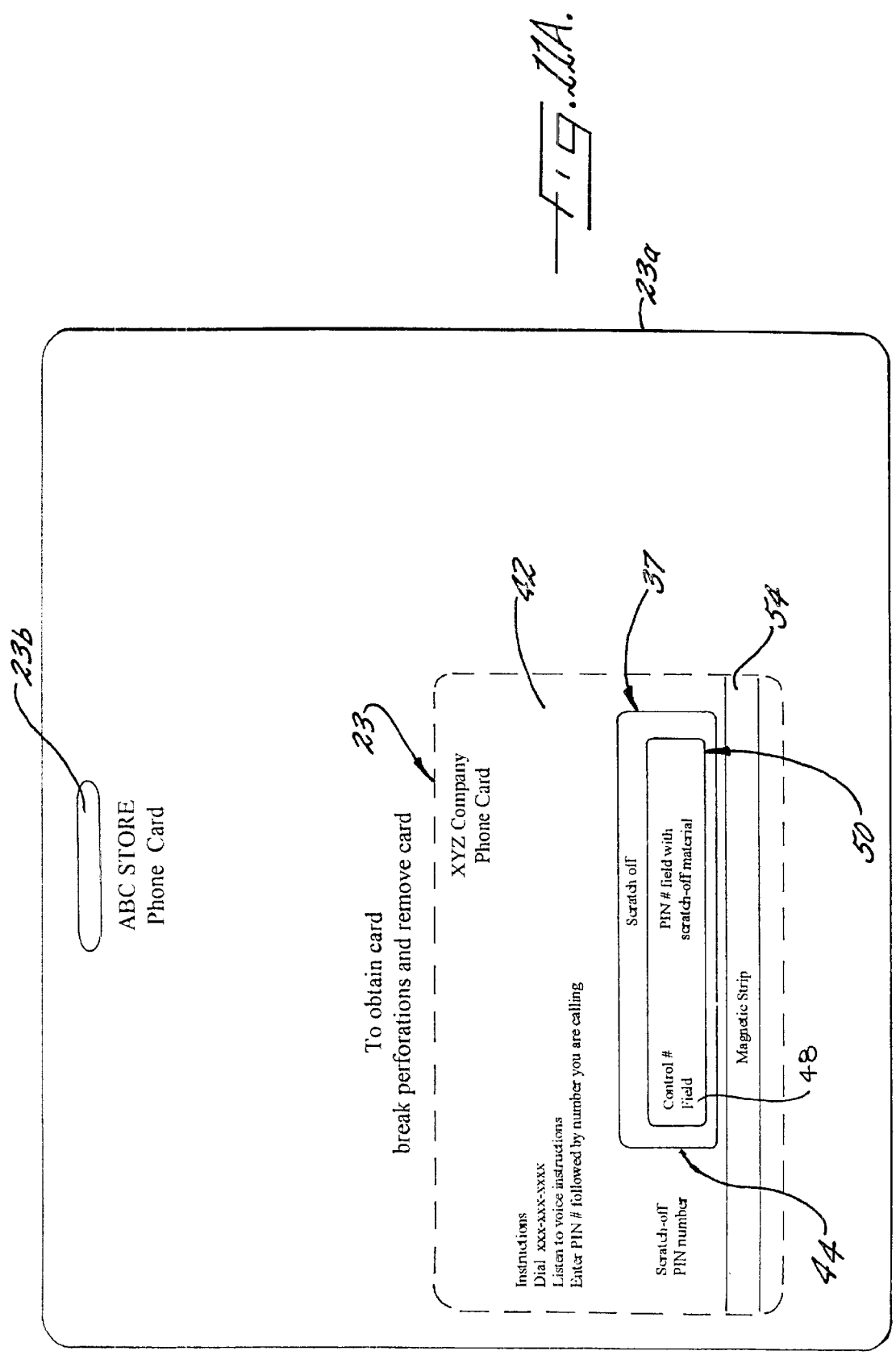

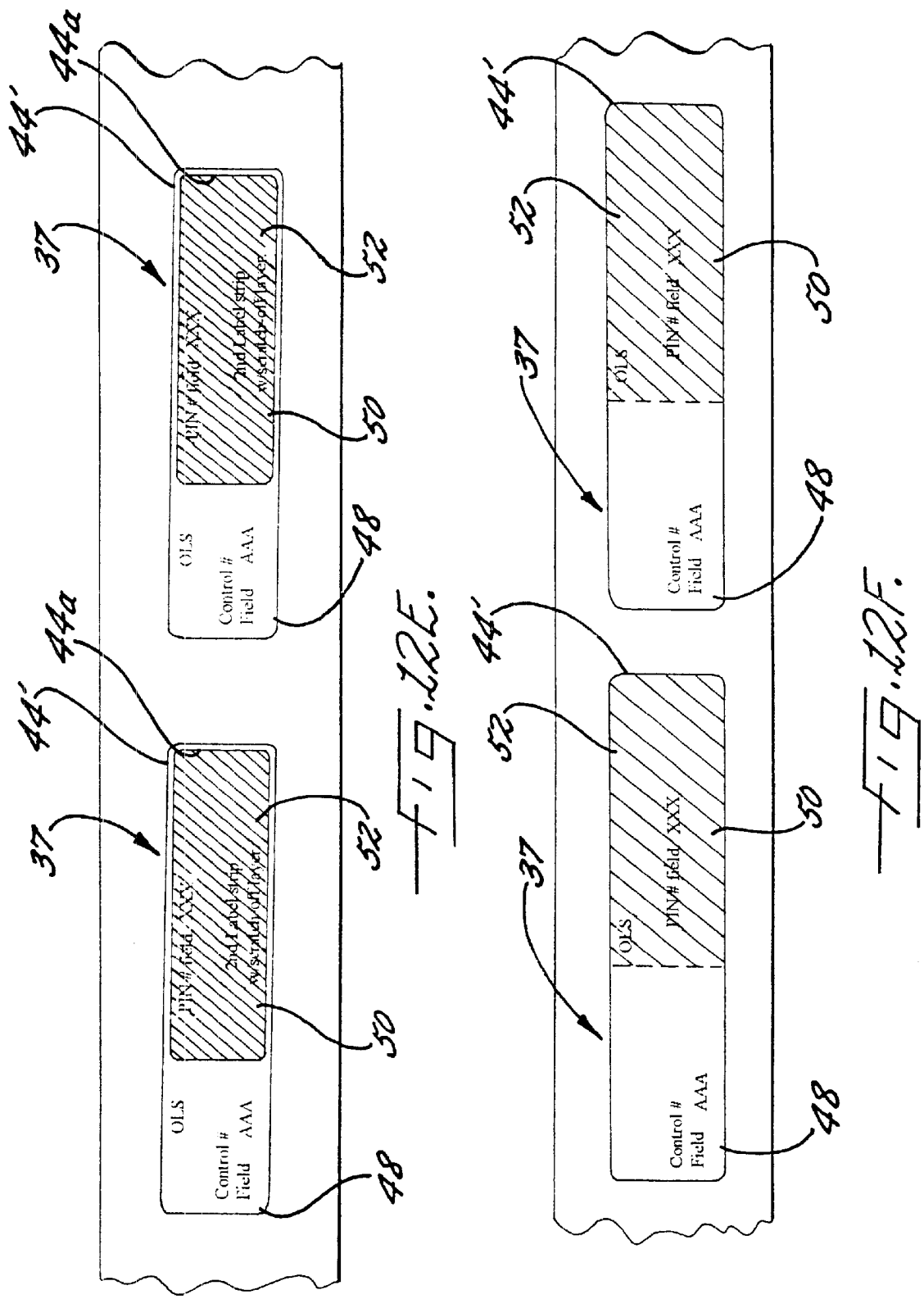

DEBIT CARD HAVING SECURE SCRATCH-OFF LABEL STRIP AND METHOD OF APPLYING SAME

RELATED APPLICATIONS

This application is a continuation-in-part of allowed patent application Ser. No. 09/496,096, filed Feb. 1, 2000, U.S. Pat. No. 6,199,757 the disclosure which is hereby incorporated by reference in its entirety.

FIELD OF THE INVENTION

This invention relates to debit cards, such as telephone calling cards, and more particularly, this invention relates to debit cards having personal identification numbers (PIN).

BACKGROUND OF THE INVENTION

In the incorporated '096 patent application, telephone calling cards and debit cards can be processed in an automated manner very quickly while also having a PIN (personal identification number) and control code applied onto the debit card or telephone calling card in an efficient manner. The PIN and control code are applied without the drawbacks of having one or two printing steps or a separate coding step required to cover the printed PIN, or the drawback of having a control number accidentally covered under high speed operating conditions.

In this copending application, a debit card or telephone calling card includes a planar card member having front and rear surfaces. A scratch-off label strip is adhered to a surface of the planar card member and in one aspect, the rear surface. This scratch-off label strip has opposing sides, one side adhered onto the planar card member and the other side having a PIN code field containing a printed PIN (personal identification number) thereon. A scratch-off layer covers the PIN code field to obscure from viewing the PIN code. The scratch-off label strip includes a base label layer that had been removed from a carrier web during an automated labeling process and applied onto the card. A control code field is positioned adjacent the PIN code field, wherein the scratch-off layer covers only the PIN code field. The control code field can include a bar code or an array of dots. This planar card member is preferably rectangular configured and wallet sized. An adhesive can be positioned on one side of the scratch-off label strip and could be a self-adhesive.

This type of construction may not always provide foolproof security depending on the types of labels used as the base label. For example, some of the debit cards, and especially the telephone calling cards, are worth as much as $500 or more. Some thieves will freeze the cards and then remove the scratch-off label from the card, revealing the PIN. For example, once the underlying base layer is removed from the card, one could see the PIN by viewing the label from the side that had been attached onto the telephone calling card. Thus, it is possible to steal a PIN number by freezing the card and removing the scratch-off label. The PIN could be copied and the scratch-off label reapplied. Afterwards, it would appear to an ordinary observer and others that the card had never been tampered with. A solution to this type of tampering is necessary because of the large number of telephone calling cards and similar debit cards that are produced and the concomitant high dollar amounts involved with such cards.

SUMMARY OF THE INVENTION

It is therefore an object of the present invention to provide a debit card, such as a telephone calling card, which has enhanced security such that even if a scratch-off label were removed, the PIN code could not be revealed.

It is still another object of the present invention to provide a telephone calling card or debit card that has enhanced security with the scratch-off label.

In accordance with the present invention, a telephone calling card, and in one aspect of the present invention a debit card, such as a credit card or telephone calling card, includes a planar card member having front and rear surfaces. A scratch-off label strip is adhered to one of the surfaces, such as the rear surface. The scratch-off label strip includes an opaque label strip applied onto the surface of the card. A PIN (personal identification number) code is applied onto the opaque label strip. In one aspect of the present invention, a second label strip is applied onto the opaque label strip and covers at least the PIN code. A scratch-off layer is applied onto the second label strip and positioned over the PIN code to obscure from viewing the PIN code.

In another aspect of the present invention, the second label strip includes an adhesive on one side that adheres the second label strip onto the opaque label strip such that the two strips cannot be removed without destroying the PIN code. It is possible that the second label strip could also be opaque.

The PIN code can be printed onto the opaque label strip by an ink jet or other means known to those skilled in the art. In one aspect of the invention, the opaque label strip has been removed from a carrier web during automated labeling process, followed by application of the second label strip in a subsequent processing step. In yet another aspect of the present invention, the entire scratch-off label strip has been prepared with the opaque label strip, PIN code, and second label strip, and wound onto a roll or carrier web, and then removed from a carrier web during an automated labeling process.

In still another aspect of the present invention, a control code field is positioned adjacent the PIN code, wherein the scratch-off layer covers only the PIN code. Adhesive is positioned on one side of the opaque label strip for adhering the opaque label strip to the planar card member. This adhesive could include a self-adhesive. It is also possible that the adhesive could be applied directly onto the card and the opaque label strip applied to the card and retained by the adhesive applied on the card. As is typical, the planar card member is preferably rectangular configured and wallet sized, such that it can be placed within the wallet of a user.

In another aspect of the present invention, the telephone calling card (or debit card) may not have to include a second label strip. A planar card member has front and rear surfaces and the scratch-off label strip is adhered to a surface, such as the rear surface. The opaque label strip is applied onto the surface of the card and the PIN code is applied onto the label strip. The scratch-off layer is positioned over the PIN code to obscure from viewing the PIN code. Thus, if the card were to be frozen and the opaque label strip removed, the PIN code could not be revealed because the opaque label strip hides the PIN code. The PIN code could only be revealed if the scratch-off layer was removed. In this instance, however, the manufacturer or end user would know that the card had been tampered with by viewing the tampered scratch-off layer.

A method of applying a PIN (personal identification number) code onto a debit card, such as a telephone calling card, is also disclosed. A batch of planar card members that have front and rear surfaces is supplied. A single planar card member is drawn in succession one at a time into a delivery mechanism. The card is fed into a labeling station. At the labeling station, the scratch-off label strip is adhered onto a surface of the planar card member. The scratch-off label strip includes the opaque label strip, the PIN code, the second label strip and the scratch-off layer applied onto the second label strip and positioned over the PIN code to obscure from viewing the PIN code.

In another aspect of the present invention, it is possible to apply the scratch-off layer as an integral strip where the opaque label strip and the second label strip adhered thereto are removed from the carrier web and applied onto the card. In another aspect of the present invention, the opaque label strip is applied onto the planar card member, followed by application of the PIN code, such as by ink jet printing, followed by the second label strip over the opaque label strip. In this instance, when no second label strip is used, then only the scratch-off layer is applied at least over the PIN code. In some instances, it is possible to apply a label over a scratch-off layer to enhance security.

BRIEF DESCRIPTION OF THE DRAWINGS

Other objects, features and advantages of the present invention will become apparent from the detailed description of the invention which follows, when considered in light of the accompanying drawings in which:

FIG. 8 is a schematic, side elevation view of a labeler that can be used for applying the scratch-off label or scratch-off label components to an article such as a telephone calling card.

FIG. 8A is an example of a carrier web showing scratch-off labels applied in spaced orientation.

FIG. 9 is a perspective view of a tray sorter showing a plurality of article bins and feed belt assemblies.

FIG. 11A shows the rear side of a planar card carrier member having a telephone calling card secured by perforations.

FIGS. 12A–12D show the steps of applying a secure scratch-off label of the present invention to a telephone calling card or debit card where the opaque label is first applied (FIG. 12A), followed by application of the PIN code (FIG. 12B), followed by the second label strip (FIG. 12C), followed by the scratch-off layer over the PIN code (FIG. 12D).

FIG. 12E shows a web of carrier material having scratch-off labels of the present invention that can be removed and applied onto a telephone calling card or debit card as a single step.

FIG. 12F shows another embodiment similar to FIG. 12E where a scratch-off label has only the opaque label strip, the PIN code printed thereon, and a scratch-off layer applied over the PIN code.

DETAILED DESCRIPTION OF THE PREFERRED EMBODIMENTS

The present invention is advantageous and provides a telephone calling card or other similar debit card with enhanced security, such that even if the scratch-off label strip were removed, such as by freezing, the PIN code could not be revealed to a possible thief. Thus, large dollar amounts are saved and manufacturers of telephone calling cards and debit cards have enhanced security and confidence in their end product. By using an opaque label strip as a base layer followed by an application of the PIN code, and a possible second label strip and scratch-off layer, even when the scratch-off label is removed, the PIN code cannot be revealed. The opaque label strip prevents viewing of the PIN code from beneath and the scratch-off layer would have to be tampered with, which is easily noticed. It is also possible that the second label strip could be opaque. When the scratch-off layer is removed, only an area where it had been removed would allow viewing of the PIN code, such as by removing part of the opaque second label strip or having that area where the PIN code printed observable to the eye.

Figure 1:
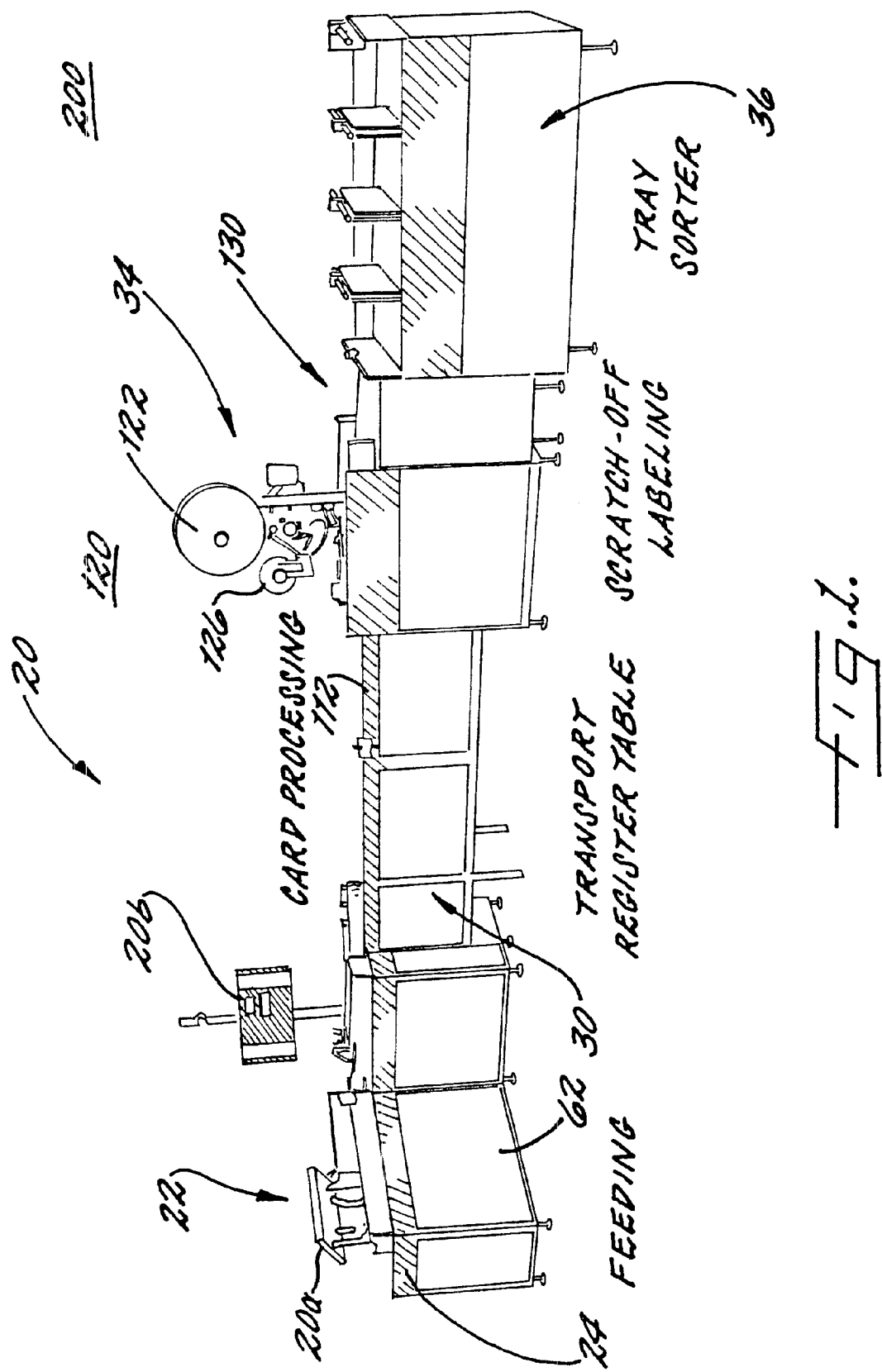
FIG. 1 is an overall perspective view of an automated card processing system of the present invention showing an article feeder, a transport register table, a scratch-off labeling station, and a tray sorter.
Figure 2:
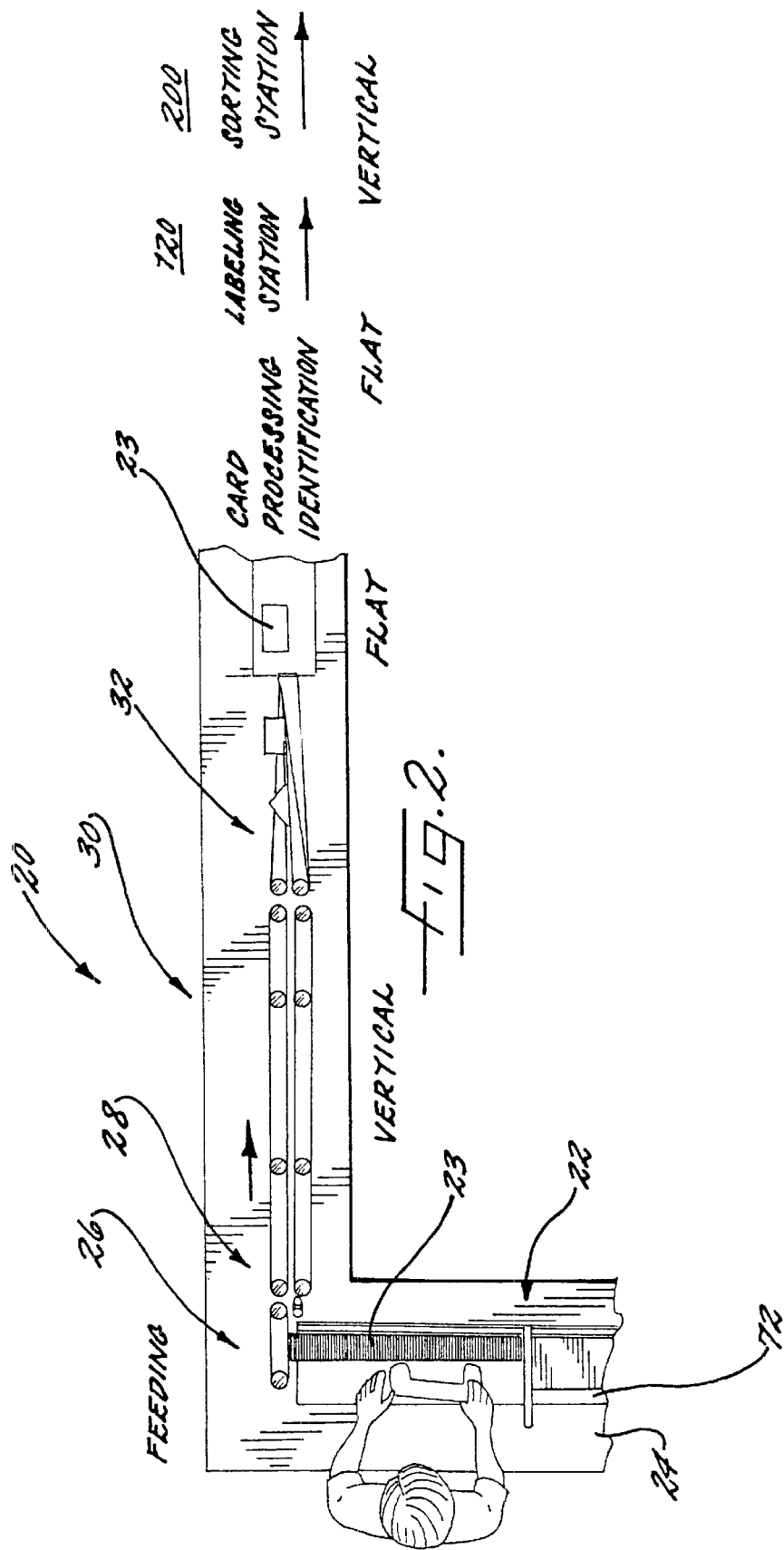
FIG. 2 is a fragmentary plan view of the automated card processing system showing the feeder, transport register table, the general location of labeling and sorting stations, and the locations where a debit card or other article is oriented vertical (standing up), flat and then vertical during processing.

FIG. 1 shows an overall perspective view of an automated card processing system 20 that can be used with the present invention, having controller 20a for controlling the article feed and controller 20b for controlling subsequent processing. FIG. 2 illustrates a fragmentary plan view of the system 20 with an article feeder 22 storing a large plurality of cards, such as wallet sized debit cards, which are illustrated as telephone calling cards 23, stacked in a feeder bin 24. The description relative to the drawings describe only one example of an apparatus and method that can be used for practicing the present invention. Other apparatus and methods as suggested by those skilled in the art are possible.

FIG. 11A shows that a telephone calling card can be contained within a card carrier member, illustrated at 23a. The actual telephone calling card can be perforated and separated from the card carrier member. For example, in the initial processing of a rigid and planar hard plastic material that would form the card carrier member, the actual telephone calling card can be outlined by perforations. Later, the card carrier member can be processed to place information on the area within the perforations that form the telephone calling card. A plurality of card carrier members can then be stacked within the article feeder and feeder bin 24, and processed in a manner as will be described below. Although the description will apply to wallet sized telephone calling cards, it should be understood that the card carrier member as shown in FIG. 11A can also be processed, and may be a preferred manner for processing. Thus, many different types of card carrier members having different dimensions, widths and heights can be processed.

It is possible to have a card carrier member that includes one or more telephone calling cards or other debit cards that could also later be stamped out instead of broken by perforations. Also, the card carrier member could be printed with a designation, such as the card origin, i.e., "ABC Store," to indicate the source of a telephone calling card. The card carrier members can be displayed at a point-of-purchase display such as hanging the card carrier member via the open slot 23b onto a post of a point-of-purchase display within a store. The card carrier member can then be fed in a vertical orientation followed by turning into the flat or laid-down configuration for processing, such as labeling, and then turned and stood back up in a vertical, standing-up orientation for sorting, as will be explained below.

The cards are then fed against a stripper belt mechanism 26 and discharged one at a time in a vertical, i.e., standing up orientation, in what is termed as a singulated manner via a feed discharge belt assembly 28 processing area, which includes a transport register table 30, which could include an associated air transport table.

As shown in FIG. 2, the article is laid flat by a twisted belt feed section 32, which orients the card 90° to lay the card flat. With the telephone calling card 23 of the present invention, the telephone calling card can be processed and identified, as well as encoded in some instances. The card or card carrier member 23a can advance while laying flat onto an air transport table having an associated scratch-off labeler 34 that applies a scratch-off label 27 onto the phone card or associated components of the label such as a base label, PIN code, and scratch-off layer. The telephone calling card moves into a tray sorter 36, as shown in FIG. 9, which includes a plurality of article bins 212 where the cards or other articles are stacked, as will be explained below.

Figure 10:
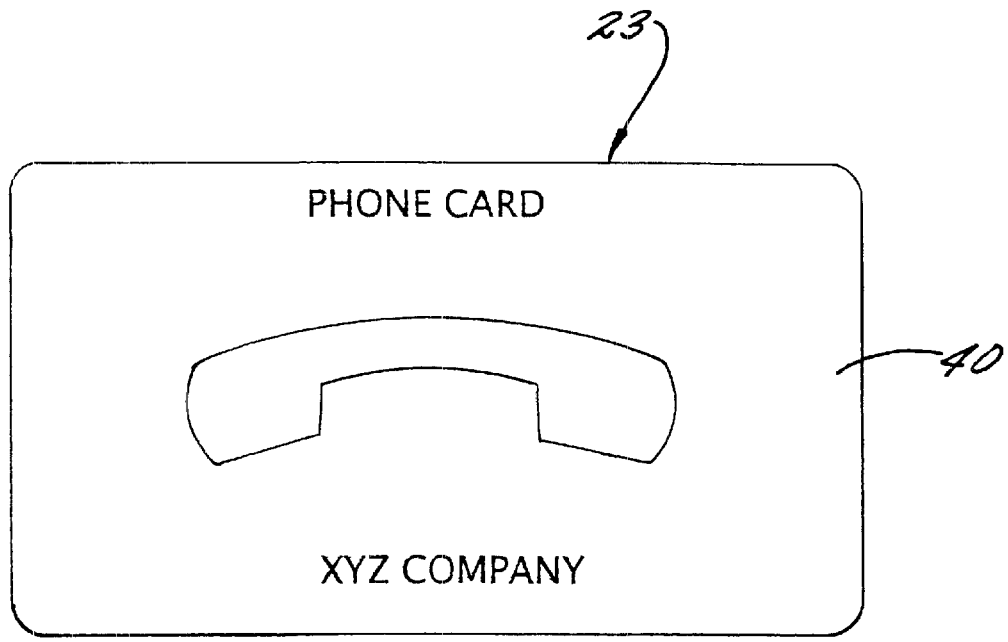
FIGS. 10 and 11 show the front and rear (reverse) sides of a telephone calling card of the present invention having a scratch-off label applied on the rear face.
Figure 11:
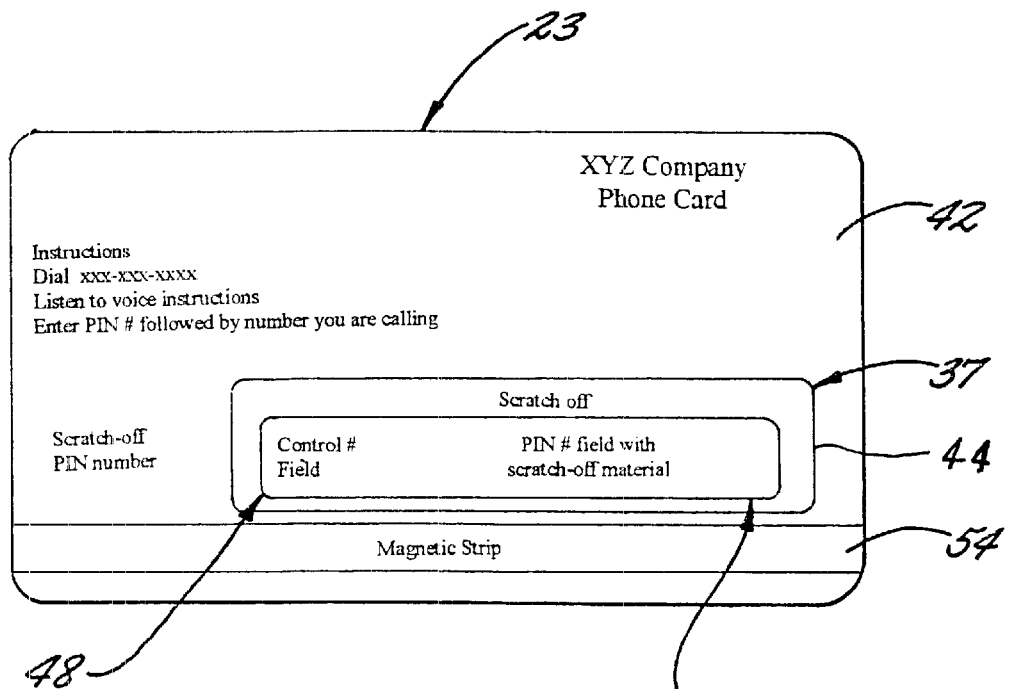
Figure 22A:
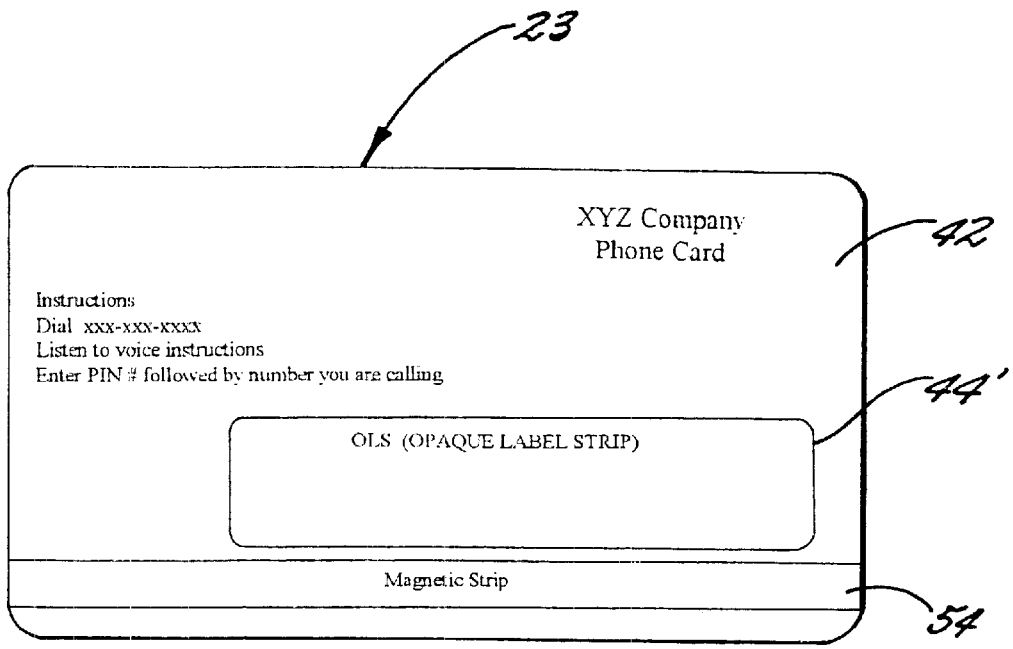
Figure 22B:
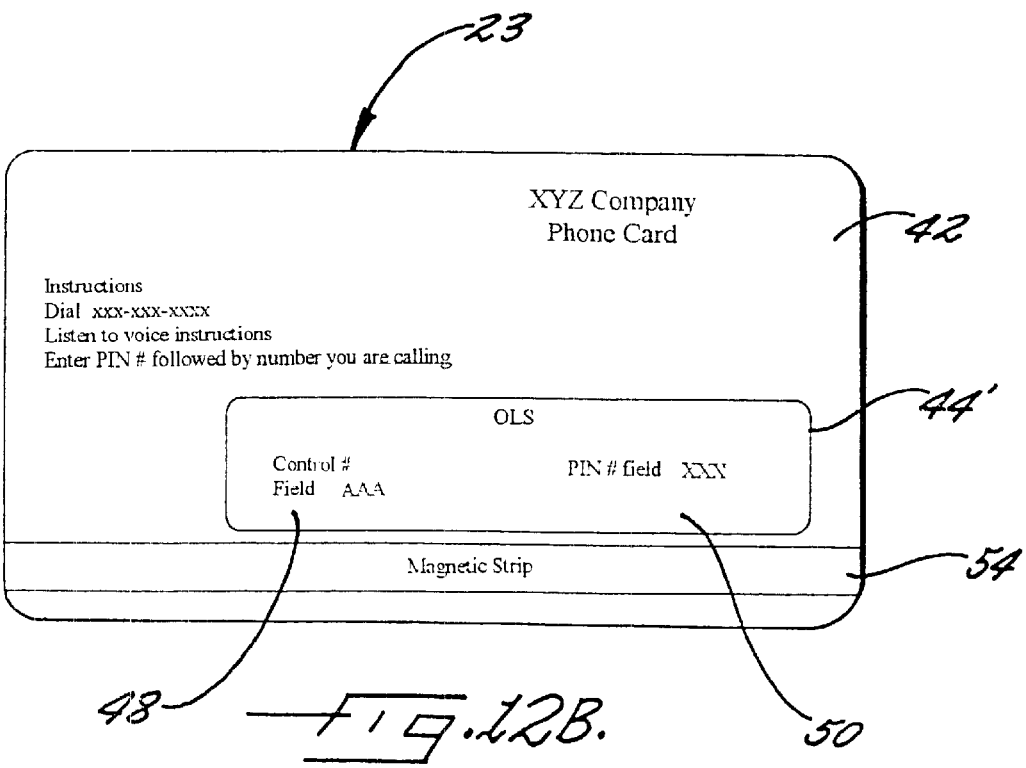

FIGS. 10 and 11 show an example of the telephone calling card 23 having a scratch-off label 37 applied onto the rear face. The telephone calling card is of a type such as issued by various telephone and other companies. The telephone calling card is preferably wallet sized and formed of a rigid plastic material. Although the card is illustrated as a telephone calling card, it could be a credit card, debit phone card, or other similar type of debit card.

The telephone calling cards are common in the United States and in many Latin American countries, where the telephone calling cards can be used without having to establish accounts or billing connections with a telephone company. The telephone calling card 23 can include on its front face 40 (FIG. 10) the identification of a phone card company, such as XYZ Company. The rear or back face 42 typically includes instructions for using the telephone calling card, such as "Dial XXX XXX XXXX," corresponding to the number of the respective card issuer. An instruction to listen to any voice instructions on the phone is printed below the dialing instruction. Naturally, the voice instructions tell a user how to use the telephone calling card. Such instructions could include also written instructions, such as instructions of how to enter the PIN number followed by the number the user is calling. Also, because a PIN number is secret, the instructions can include the directions for scratching off the covering contained over the PIN number.

As also disclosed in the incorporated by reference and allowed Ser. No. 09/496,096 patent application, FIG. 11 illustrates a scratch-off label 37 that has been applied to the phone card. The scratch-off label 37 is formed from a lower label film, i.e., base label layer 44, such as formed from polyester or some other thin film material. This lower label film 44 forms the base part of the scratch-off label 37 and a plurality of these lower label films 44 forming the labels 37 can be positioned on a carrier web 46 (FIG. 8A) as known to those skilled in the art. The carrier web 46 having the applied labels is typically wound on a supply roll as known to those skilled in the art. The lower side of the lower label film 44 engaging the carrier web can include a self-adhesive that adheres the label 37 to the carrier web. A control code field 48 is positioned on one side of the lower label film 44, together with an associated PIN code field 50. The PIN code field 50 has a PIN, i.e., PIN code, printed thereon and is covered with a scratch-off layer formed as a paint or other similar coating 52 (FIG. 8A) that can be scratched-off by the purchaser of the telephone calling card. The PIN code typically is four to eight digits or could include an alphanumeric code. FIG. 8A illustrates three scratch-off labels carried on a web. The first scratch-off label 37a has a portion of the coating, i.e., scratch-off layer, 52 scratched off to display a numeric PIN code.

The control code field 48 is not covered with a scratch-off layer and is left exposed on the base label layer. This field 48 could include an alphanumeric code 48a, a bar code 48b or a two-dimensional bar code 48c, as illustrated in FIG. 8A. It is also possible to use a series of snow flakes or dots formed as a grid or matrix that can be decoded in bit form. The bar code can be a two-dimensional bar code with a dot matrix configuration. As is known, the control code could be scanned optically by other means to allow encoding via a data encoded strip, such as a magnetic strip 54, of dollar amounts. Other information could be contained on the magnetic strip as is well known to those skilled in the art. It is also possible to apply the data encoded strip as a label stripe during processing before, simultaneously or after the application of the scratch-off label 37. Although the illustrated embodiment shows a control code printed on the scratch-off label base layer 44, it is not necessary that the control code field be positioned on the scratch-off label 37.

Figure 12C:
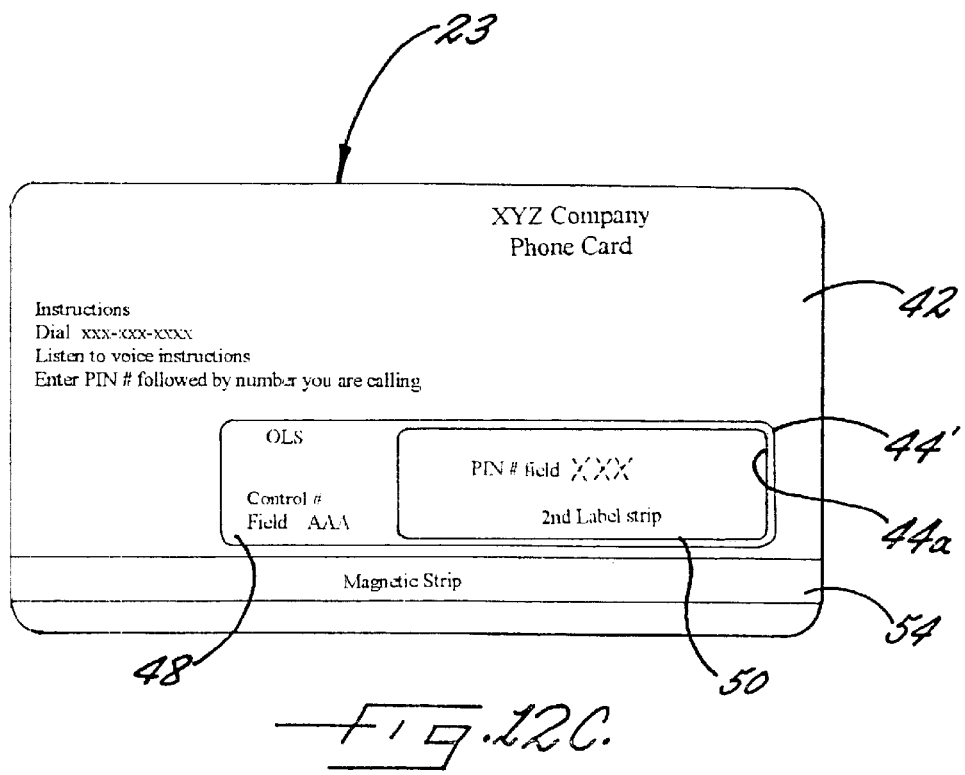

FIGS. 12A–12F illustrate the enhanced security features of the telephone calling card and debit card of the present invention. The enhanced security features are provided by the use of an opaque label strip 44' as a lower label film, i.e., base label layer. As shown in FIG. 12A, the opaque label strip 44' can be applied first onto the planar card member forming the debit card, e.g., telephone calling card. A PIN code (XXX as an example) is sprayed by ink jet printing, for example, or other known printing methods, onto the opaque label strip 44' at the PIN code field 50. The control number field 48 also has a printed control number (AAA in this example), which can also be sprayed or printed by other known printing means at this time.

In one aspect of the present invention, a second label strip 44a is then applied over the opaque label strip 44' to cover the PIN number, but leave the control number field exposed (FIG. 12C). The second label strip is then coated with a scratch-off layer 52 (FIG. 1D) such as described before and shown by the diagonally extending hatch lines. As known to those skilled in the art, once the scratch-off layer 52 is removed, the PIN code is revealed and readable by the user. As illustrated, in the embodiment where the control number field 48 is applied onto the opaque label strip 44', the second label strip 44a is applied only over the PIN number field 50 to leave exposed the control number field 48. It is possible to have the control number field 48 applied directly onto the second label strip having the scratch-off layer 52 applied thereto.

Figure 12D:
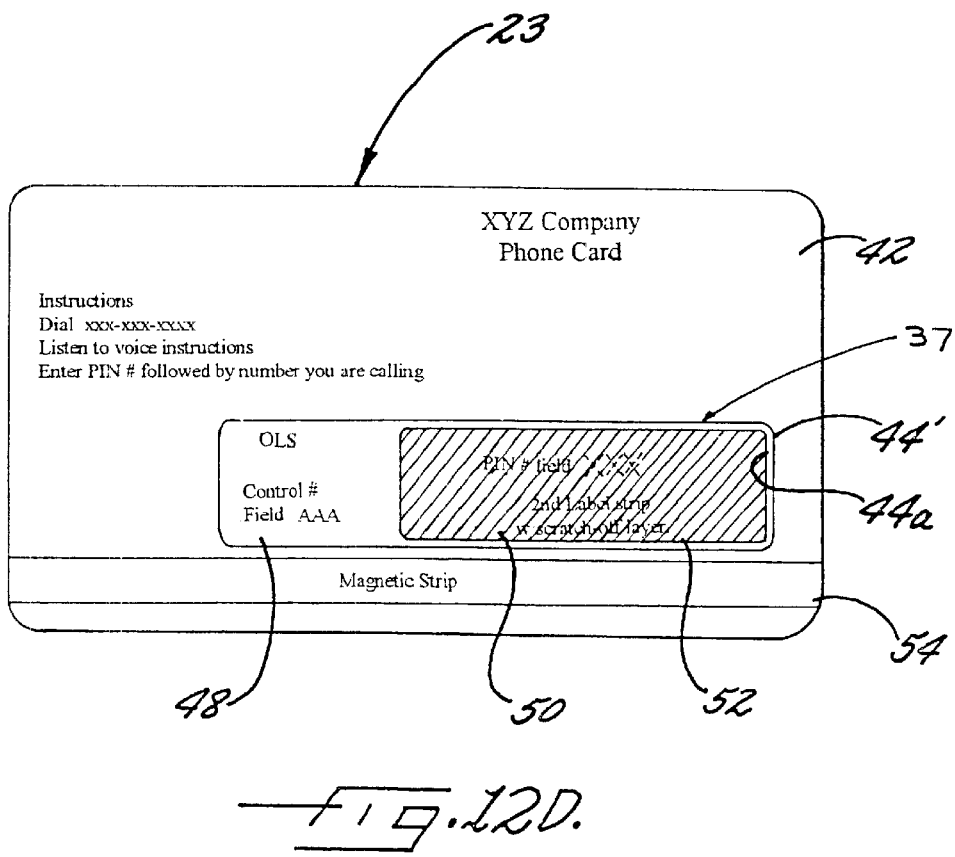

FIGS. 12A–12D illustrate how manufacturing of the telephone calling card of the present invention can occur by first applying the opaque label strip 44 onto the card (FIG. 12A), followed by application of the PIN and control codes (FIG. 12B), followed by application of the second label strip (FIG. 12C) and the application of the scratch-off layer thereon (FIG. 12D). The opaque label strip 44' can be applied by a self-adhesive applied onto the rear side of the opaque label strip, or the opaque label strip could be devoid of any adhesive and applied directly onto the planar card member, which could have an adhesive thereon to retain the opaque label strip thereon. Additionally, the second label strip 44a having the scratch-off layer 52 could include an adhesive, such as a self-adhesive applied on one side, to allow secure application of the second label strip onto the opaque label strip.

It is thus evident that if the entire scratch-off label 37 is removed, the opaque label strip 44' would prevent the possible thief or other person from viewing the PIN code without destroying the label or removing the scratch-off layer 52. If the scratch-off layer 52 had been tampered, this would indicate that the telephone calling card 23 had been compromised. Although the use of a second label strip is shown, it is not essential to practice the invention by using a second label strip. For example, the opaque label strip 44' could have the scratch-off layer 52 applied over the PIN code field without a second label strip. When the scratch-off layer is removed, the PIN code will not be affected as long as adequate ink or other material is used for the PIN code. If the scratch-off label strip 37 were removed, one could not view the PIN code through the opaque label or through the scratch-off layer 52 without destroying the opaque label or removing the scratch-off layer. In this instance, tampering would be clearly evident.

In this type of embodiment, it is even possible to apply a second label on the scratch-off layer and other portions of the opaque label strip as added security. Part of the second strip could be removed, such as by perforations that tear, or by scratching, or other techniques known to those skilled in the art.

FIG. 12E illustrates an aspect of the present invention where the scratch-off label 37 has been formed as an integral unit and carried as single scratch-off label units on a carrier web 46, which is typically placed in roll format such that a plurality of scratch-off labels 37 are carried on the carrier web in roll form and removed during automated processing and applied onto respective telephone calling cards or debit cards. This type of processing can be advantageous for high speed application of the scratch-off label onto many different cards. Thus, the entire scratch-off label 37 is removed as one integral scratch-off label unit, having the opaque label strip, PIN code, control code field (if used), the second label strip and the scratch-off layer, as one label unit and applied onto a card. Naturally, as described before, the individual components of the scratch-off label strip could be applied one at a time. The second label strip could also be applied with a scratch-off layer already applied onto the strip. Also, if a clear second label strip is used, it could cover the control number field.

FIG. 12F illustrates another embodiment where a second label strip is not used as described before. Instead, the scratch-off layer is applied directly over the PIN code. FIGS. 12E and 12F also illustrate that the scratch-off label 37 can be applied from a carrier web and applied singularly one at a time onto respective card members.

The present invention as described provides for enhanced security. The scratch-off label can be removed, such as by freezing, but the PIN code will not be compromised because it cannot be seen through the opaque label strip or the second strip and scratching layer or scratch-off layer itself. Naturally, if a second label strip is used, it could be an opaque label strip, and when the scratch-off layer removed, a portion of the second opaque label can be removed or could be opaque only enough to see the PIN code when the scratch-off layer is removed as described before.

An article feeder 22 can be used not only for feeding thick and rigid articles, such as credit cards and phone cards, but can also be used for feeding many different types of mail, including small envelopes and large envelopes of varying thickness together with intermixed mail that is tabbed. The following description is only one type of card processing mechanism that can be used with the present invention. Other types of card processing apparatus and methods can be used as known to those skilled in the art. The article feeder 22 can feed up to 50,000 pieces per hour and has a unique feed system, e.g., singulator, to allow most intermixed mail to feed without adjustments from a large stack, such as shown in FIG. 2, where exemplary phone cards are stacked in a stand-up, i.e., vertical configuration. Although FIG. 2 shows a large plurality of about three feet of phone cards stacked in the feeder bin 24, any type of mail can be intermixed and fed single into the feed discharge belt assembly 28.

Figure 3:
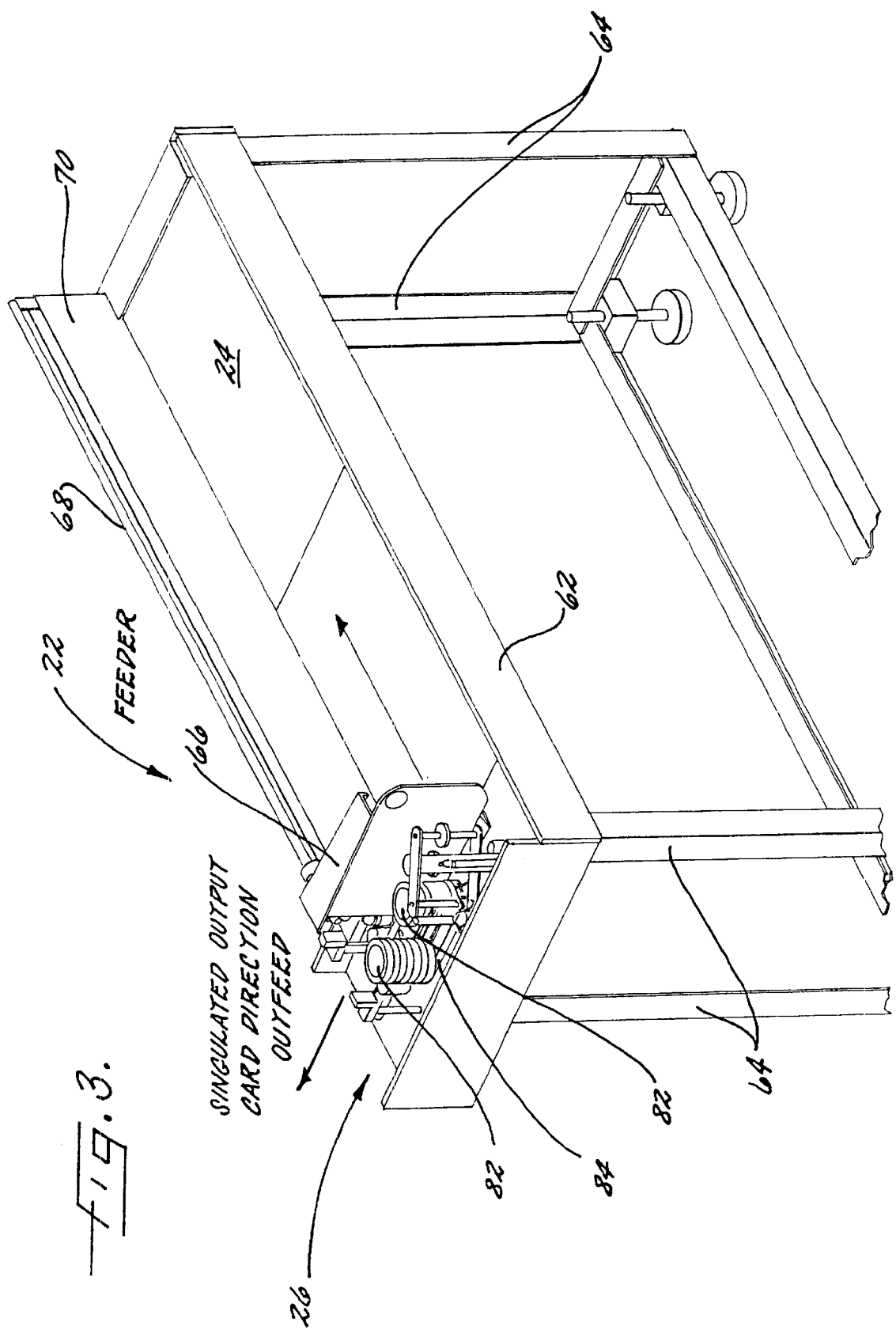
FIG. 3 is a schematic, isometric view of the article feeder and showing details of the article stripper mechanism.
Figure 4:
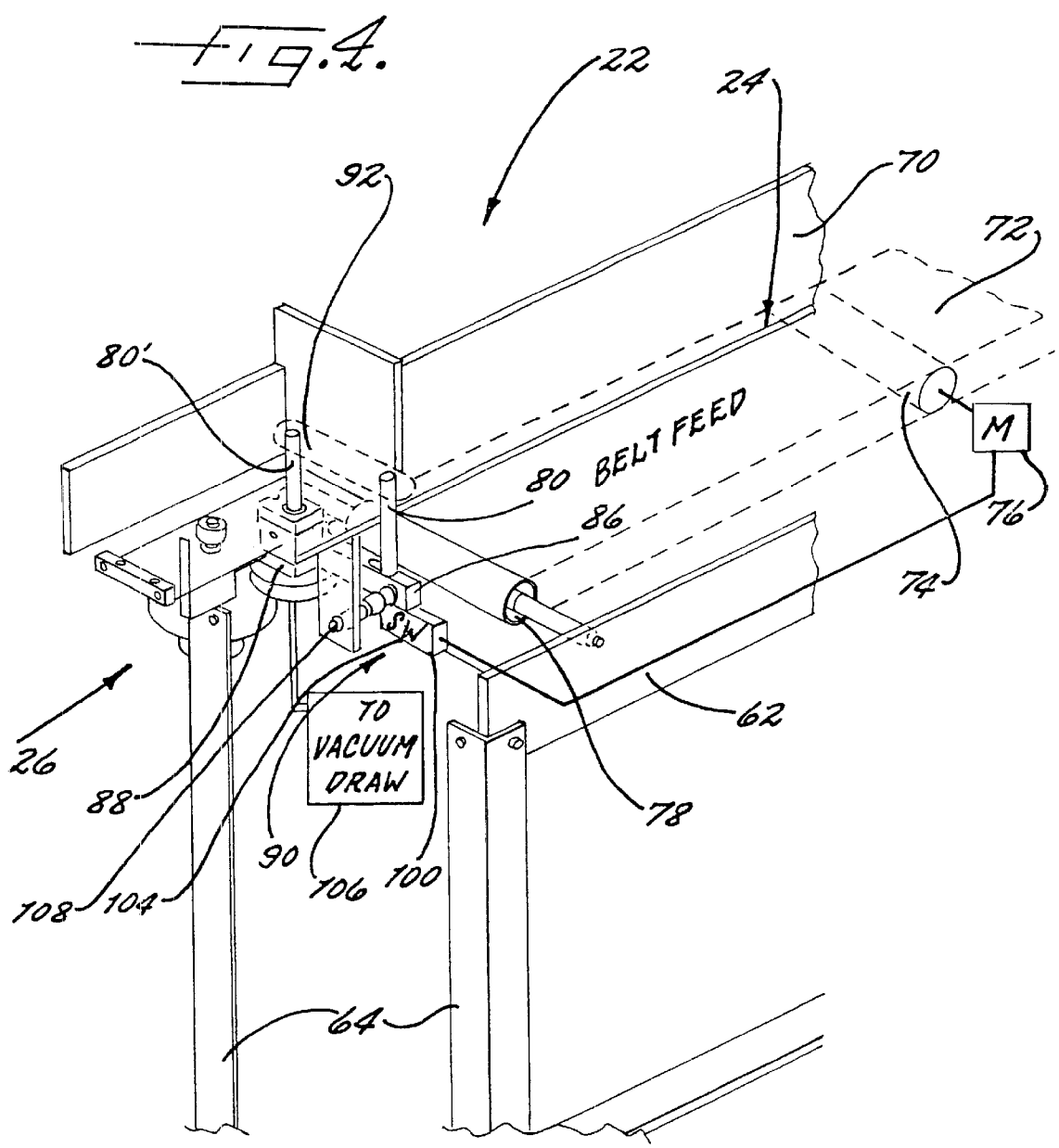
FIG. 4 is a partial isometric view of the article feeder of FIG. 3, showing greater details of the stripper mechanism, including the belt feed, vacuum draw and microswitch for controlling the belt feed motor.

As shown in greater detail in FIGS. 3 and 4, the feeder bin 24 is positioned on a support table 62 having support legs 64, which give a feed height that is the same as the other components and tables of the automated card processing system, as shown in FIG. 1. An article retaining plate 66 is slidably moveable on a guide rod 68 and positioned adjacent a side support 70. Cards, such as the illustrated phone card, or other articles, such as pieces of mail and envelopes, are stacked against the side support 70. The retaining plate 66 is moved forward with spring biasing against the articles as shown in FIG. 2. As better shown in FIG. 4, the stack of articles positioned in the feeder bin 24 rest on a conveyor belt 72 that is positioned over a first belt pulley 74, which is driven by a motor 76 that actuates and drives a second belt pulley 78.

Figure 5:
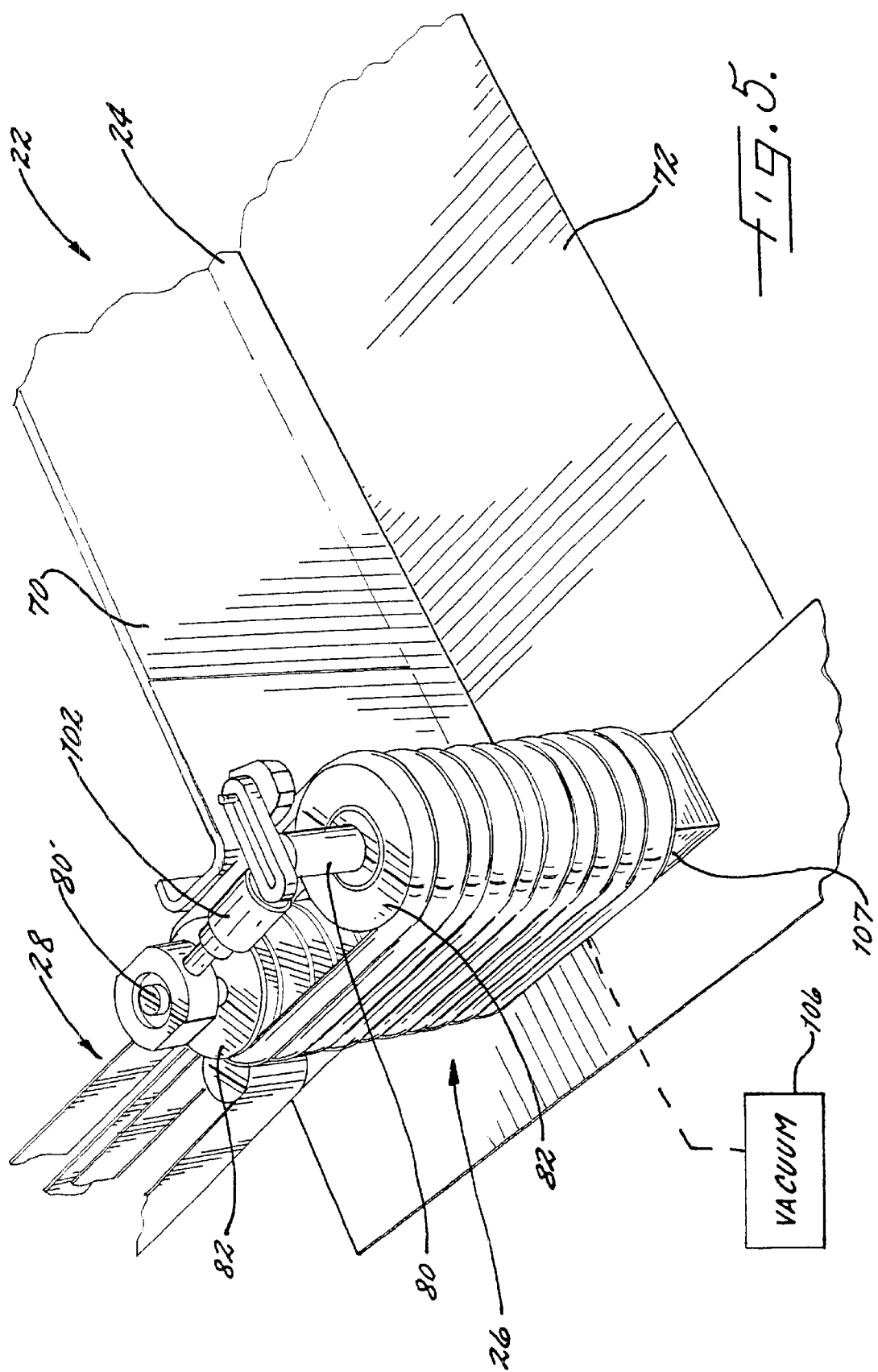
FIG. 5 is an enlarged isometric view of the stripper belts shown in FIG. 3.

FIG. 5 is an enlarged isometric view of the stripper belt mechanism 26 for the article feeder 22. The stripper belt mechanism 26 includes two stripper support shafts 80 (FIGS. 3 and 4) that support stripper rolls 82 having a plurality of stripper belts 84 positioned on the stripper rolls 82. As shown in FIG. 4, the first and second stripper support shafts 80 are positioned such that the stripper rolls 82 and associated stripper belts 84 provide a flat surface against which the cards or other articles engage the belts as shown in FIG. 2.

The stripper support shafts 80 are supported on a horizontally moveable shaft support member 86 that is moveable in a direction to and from the article conveyor belt 72. A drive motor 88 engages one of the stripper support shafts, i.e., the first shaft, to rotate the associated stripper rolls and stripper belts. In FIG. 4, the first stripper support shaft 80' is powered for rotation. An adjustable biasing member 90 is engaged against the shaft support member 86 and applies a biasing force against the shaft support member 86 to allow a back pressure to be exerted against articles stacked in the feeder bin 24.

Figure 6:
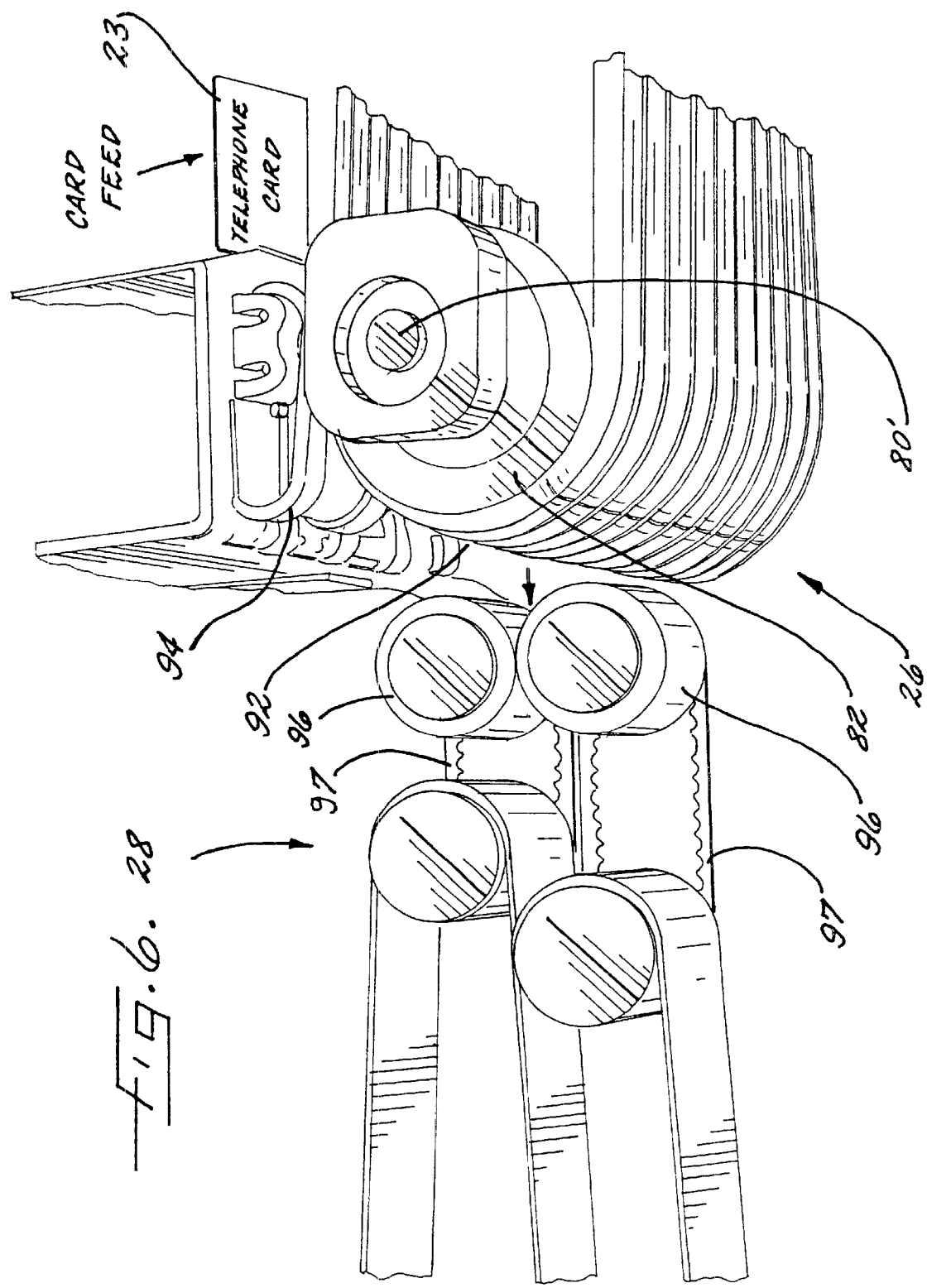
FIG. 6 is another isometric view of the stripper belts and showing the stripper fingers and feed discharge belt assembly.

Friction between the article, such as the illustrated telephone calling card, and the stripper belts 84, allows an article, e.g., telephone calling card, to be "stripped" or drawn away from the stack in singulated fashion, one-by-one, into the feed discharge belt assembly 28. As shown in FIG. 6, each article is pulled away from the article stack through a pre-shingler 92, such as formed from Teflon, and through a series of stripper fingers 94, which guide the article through two discharge pinch rolls 96, which then feed the article into the discharge belts of the feed discharge belt assembly 28. The feed discharge belt assembly 28 and pinch rolls 96 can be driven from common belt transmission 97. At the same time, the stack of articles is pushed by the conveyor belt 72 and retaining plate 66 against the stripper belts 84 to create friction. The conveyor belt movement is controlled in off/on fashion by a microswitch 100, as shown in FIG. 4 as a schematic, rectangular block. A pressure coupling mechanism 102 is mounted on top of the support shafts and the microswitch 100 could be operative with the coupling mechanism (FIG. 5). Different types of microswitches can be used as known to those skilled in the art.

In one aspect of the present invention, the biasing member 90 is formed as spring 104, and biases the shaft support member 86 forward, which in turn, biases the stripper belts 84 against the stack of articles. As the spring biases the shaft support member 86 forward, it actuates the microswitch 100, which turns the conveyor belt motor 76 on and advances the conveyor forward to force cards or articles against the stripper belts. This action forces the stripper belts and shaft support member 86 back, actuating the microswitch to turn the motor off. This releases the back pressure against the article. However, as noted before, with this system only, thinner articles, such as very thin envelopes, sometimes have excessive pressure exerted against them, and as a result, "bunches" of envelopes or other thin articles could be grabbed under friction and forced through the discharge area.

Vacuum can be applied from a vacuum source 106 onto the area associated with the front part of the stripper belts, such as through a vacuum plate 107, having vacuum orifices contained in the plate, or through orifices in the shafts or other means, to draw the first article in the stack against the stripper belts 84 (FIG. 5). Also, the spring 104 can be adjustable, such as by an adjustable screw 108, as illustrated, to increase or decrease the amount of tension, and thus, the exerted back pressure. Thus, it is possible to decrease the amount of tension (back pressure) that could be applied by the stripper belts onto the article stack such that primarily the vacuum provided by the vacuum source 106 would retain an article, such as a thin envelope, against the stripper belts. With this low pressure used for retaining an article, such as when thin articles are fed, only one thin article would be fed or "stripped" into the feed discharge belt assembly 28.

The smaller biasing force of the retaining plate 66 can also be used to push the articles with sufficient pressure against the belts, which together with the vacuum draw of the article, allows article feeding in a singulated fashion even when thin articles and envelopes are used or other articles of mail. If thicker articles, such as a telephone calling card or credit card, are stacked in the feeder bin, then greater back pressure can be exerted by adjusting the spring pressure to allow greater back pressure and allow "stripping" of the cards from the stack.

The article passes into the feed discharge belt assembly 28 and into a transport register table 30. Up to this point in time, the articles have been processed in vertical orientation, i.e., "standing up." At this time, the article is laid flat by the twisted belt feed section 32, which rotates the article 90° to lay the article flat for further processing, such as tabbing, or as in the present invention description, to allow card processing identification, such as encoding, and labeling, where the scratch-off label 37 can be applied as an integral unit, or as component parts serially, as in application of the opaque label strip, followed by code printing, the second label strip and/or the scratch-off layer. An example of a type of twisted belt feed section that could be used is disclosed in U.S. Pat. No. 5,393,366 and assigned to the present assignee of the present invention, Profold, Inc., the disclosure which is hereby incorporated by reference in its entirety.

The telephone calling card is transported along the transport register table, which also could include an associated or separate air transport table 112, which is designed for high-speed, i.e., 50,000 pieces per hour. Air suction is low vacuum and has high air volume for strong article adherence to the belt surface, such as 700 cubic feet of air suction per minute. The air transport could be formed with two belts for more controlled applications of larger articles besides cards, such as envelopes, and also provide control over other processes, such as with ink jet printing. A solid strip can separate the two parallel belts. The air transport table can be adjusted in height and has a modular design to be used in line with feeders, tabbers, labelers, affixers, and other equipment.

Figure 7:
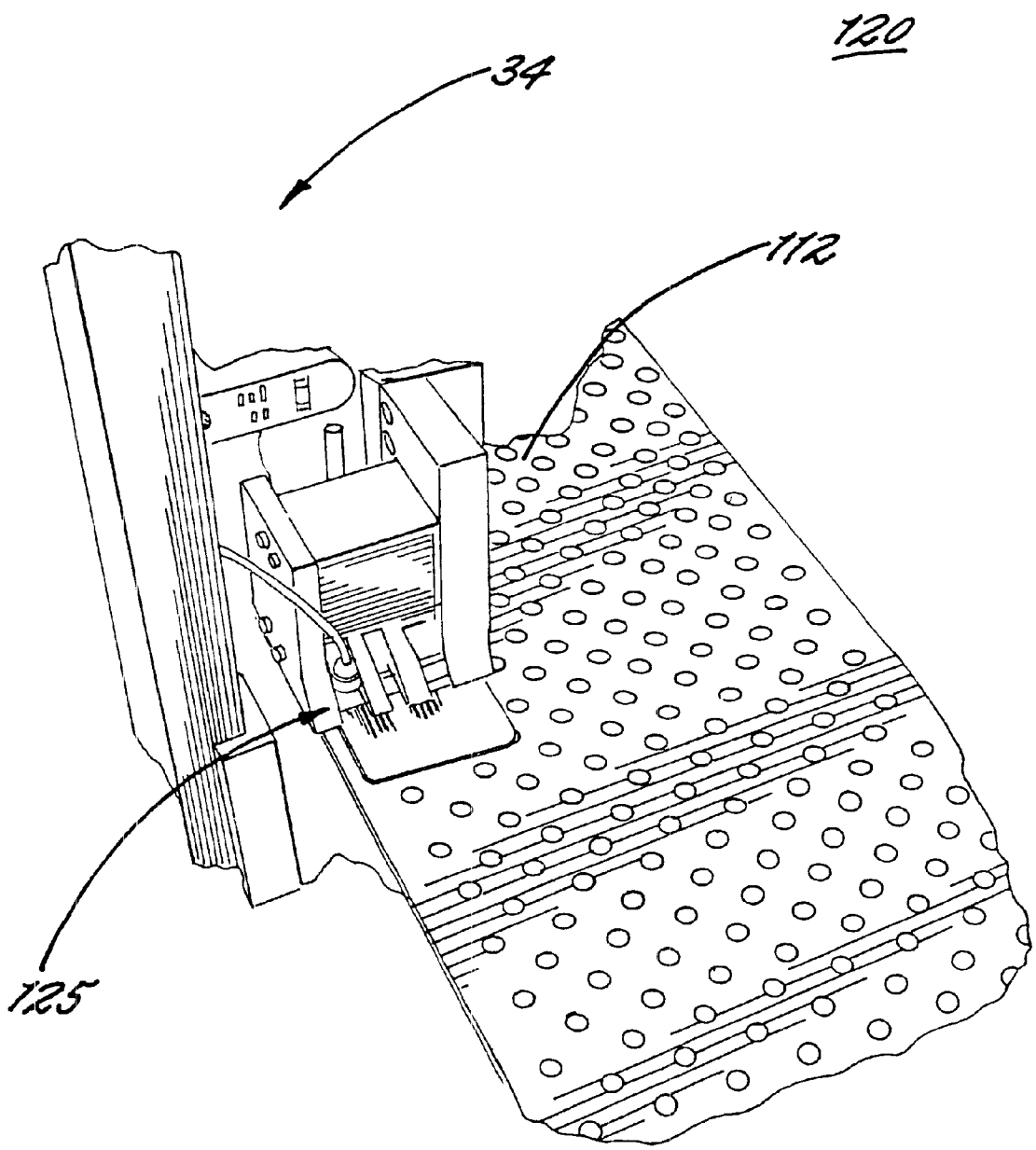
FIG. 7 is a partial isometric view of a labeler that can be used for applying the scratch-off label of the present invention.

FIGS. 7 and 8 show a labeling station 120 where a scratch-off labeler 34 has a supply reel 122, having a roll formed of a carrier web of labels in which a series of idler and drive rolls 124 form a serpentine, controlled delivery path for the carrier web where the label is stripped by a label stripping mechanism 125 from the carrier web, in timed unison, with the telephone calling card as the telephone calling card advances into the label applying station 120. The label 37 adheres to the telephone calling card. The carrier web is taken up in a take-up reel 126.

One of the benefits of the label 37 of the present invention over prior art telephone calling cards using a printed PIN and control code is the accuracy required when any scratch-off layer using paint or other coating was applied. The application of any coating had to be accurately aligned with the printed PIN number while leaving unexposed the control code. It also could not interfere with the control code field. A label having a preprinted control code field and PIN code in the PIN code field can be applied onto the telephone calling card at very high speeds, up to 50,000 pieces an hour, with some inaccuracy as long as the label does not cover necessary portions, such as any magnetic strip. The phone card would be operable.

Once the telephone calling cards have been labeled, they are then transported into an article stand-up feed section 130, where a 90° feed belt section turns the cards in vertical, i.e., "standing up", orientation. The telephone calling cards are then fed into a sorting station 200, such as that shown in FIG. 9, where a plurality of article bins receive articles from respective feed belt assemblies as explained below.

Referring now to FIG. 9, there is illustrated the sorting station 200, which includes a tray sorter 36 that sorts articles, such as the illustrated telephone calling card or other articles and mail pieces, by feeding individual articles in vertical orientation along a predetermined path of travel into a respective article bin 212. The articles could include mixed pieces that have different sizes, including different lengths and widths of mail and different thicknesses. In the illustrated example, the articles are the same-size telephone calling cards 27.

As evident, the sorting station 200 has four article bins 212 that receive articles from four respective feed belt assemblies 214. Although four article bins 212 and four feed belt assemblies 214 are illustrated, naturally, the sorting station 200 can include one, two or any number of different article bins having respective feed belt assemblies as necessary for the processing of articles.

Each article bin 212 includes two parallel side walls 212*a* and a biased end wall 212*b*, forming a rectangular configuration. The end wall 212b is slidable on a support rod 212c via a support flange 212d that extends across the top portion of the end wall 12b. A bottom surface 212e holds the article. Sheet steel, plastic or other materials known to those skilled in the art can be used to construct the article bin.

The articles are fed by the feed belt assembly 214 in a vertical orientation, and not horizontal. The articles enter the feed belt assembly 214 having at least one large longitudinally extending feed belt 218 that is driven by a drive roller 220 connected to a drive motor (not shown) at the belt end defined by the endless loop. The belt 218 engages stationary tension rolls 222 that maintain pressure on the feed belt 218. The feed belt 218 is a flat belt. Positioned adjacent the feed belt is another flat drive belt 224. The article is passed between the endless loop feed belt 218 and the endless loop flat drive belt 224.

As illustrated, in accordance with the present invention, the feed belt assembly 214 includes a discharge end positioned adjacent the article bin 212, for discharging articles into the bin 212. The feed belt assembly 214 at its discharge end 226 can include first and second brush rolls 230, 232 positioned at the discharge end of the feed belt assembly. When articles are thin mail pieces, the brush rolls can be used to impart a concave profile to the mail piece to aid in reducing any damage to a side edge of each individual mail piece. When the articles are smaller dimensioned phone cards, the brush rollers do not have to be used.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A telephone calling card comprising:
   a planar card member having front and rear surfaces;
   a scratch-off label strip that has been adhered to one of the surfaces, and comprising
   an opaque label strip applied onto a surface of the card;
   a PIN (personal identification number) code applied onto the opaque label strip;
   a second label strip applied onto the opaque label strip and covering at least the PIN code; and
   a scratch-off layer applied onto the second label strip and positioned over the PIN code to obscure from viewing the PIN code.

2. A telephone calling card according to claim 1, wherein said PIN code is printed onto the opaque label strip by ink jet.

3. A telephone calling card according to claim 1, wherein said opaque label strip has been removed from a carrier web during an automated labeling process, followed by the application of said second label strip.

4. A telephone calling card according to claim 1, wherein said scratch-off layer is applied onto the second label strip before application of said second label strip to said opaque label strip.

5. A telephone calling card according to claim 1, wherein said second label strip is applied to said card.

6. A telephone calling card according to claim 1, wherein said scratch-off label strip has been removed from a carrier web during an automated labeling process together with the second label strip.

7. A telephone calling card according to claim 1, and further comprising a control code field positioned adjacent the PIN code, wherein the scratch-off layer covers only the PIN code.

8. A telephone calling card according to claim 1, and further comprising an adhesive positioned on one side of said opaque label strip for adhering said opaque label strip to said planar card member.

9. A telephone calling card according to claim 8, wherein said adhesive comprises a self-adhesive.

10. A telephone calling card according to claim 1, and further comprising an adhesive positioned on one side of said second label strip for adhering said second label strip to said opaque label strip.

11. A telephone calling card according to claim 1, wherein said planar card member is rectangular configured and wallet sized.

12. A debit card comprising:
    a planar card member having front and rear surfaces;
    a data encoded strip positioned on one of the surfaces;
    a scratch-off label strip that has been adhered to one of the surfaces, and comprising
    an opaque label strip applied onto a surface of the card;
    a PIN (personal identification number) code applied onto the opaque label strip;
    a second label strip applied onto the opaque label strip and covering at least the PIN code; and
    a scratch-off layer applied onto the second label strip and positioned over the PIN code to obscure from viewing the PIN code.

13. A debit card according to claim 12, wherein said data encoded strip comprises a magnetic strip.

14. A debit card according to claim 12, wherein said data encoded strip is formed as a label stripe that has been applied in an automated labeling process, followed by the application of said label strip.

15. A debit card according to claim 12, wherein said debit card comprises a telephone calling card.

16. A debit card according to claim 12, wherein said PIN code is printed onto the opaque label strip by ink jet.

17. A debit card according to claim 12, wherein said opaque label strip has been removed from a carrier web during an automated labeling process, followed by the application of said second label strip.

18. A debit card according to claim 12, wherein said scratch-off layer is applied onto the second label strip before application of said second label strip to said opaque label strip.

19. A debit card according to claim 12, wherein said second label strip is applied to said card.

20. A debit card according to claim 12, wherein said scratch-off label strip has been removed from a carrier web during an automated labeling process together with the second label strip.

21. A debit card according to claim 12, and further comprising a control code field positioned adjacent the PIN code, wherein the scratch-off layer covers only the PIN code.

22. A debit card according to claim 12, and further comprising an adhesive positioned on one side of said opaque label strip for adhering said opaque label strip to said planar card member.

23. A debit card according to claim 22, wherein said adhesive comprises a self-adhesive.

24. A debit card according to claim 12, and further comprising an adhesive positioned on one side of said second label strip for adhering said second label strip to said opaque label strip.

25. A debit card according to claim 12, wherein said planar card member is rectangular configured and wallet sized.

26. A method of applying a PIN (personal identification number) onto a debit card comprising the steps of:

supplying a batch of planar card members that have front and rear surfaces;

drawing in succession a single planar card member at a time into a delivery mechanism;

feeding the card into a labeling station; and at the labeling station, adhering a scratch-off label strip onto a surface of the planar card member, said scratch-off label strip comprising an opaque label strip applied onto a surface of the card;
a PIN code applied onto the opaque label strip;
a second label strip applied onto the opaque label strip and covering at least the PIN code; and
a scratch-off layer applied onto the second label strip and positioned over the PIN code to obscure from viewing the PIN code.

27. A method according to claim 26, and further comprising the step of removing the scratch-off label strip from a supply roll and applying the scratch-off label strip onto the planar card member as an integral scratch-off label strip.

28. A method according to claim 26, and further comprising a data encoded strip positioned on a surface of the planar card member.

29. A method according to claim 26, wherein said planar card member is rectangular configured and wallet sized.

30. A method according to claim 26, wherein the debit card comprises a telephone calling card.

31. A method of applying a PIN (personal identification number) onto a debit card comprising the steps of:

supplying a batch of planar card members that have front and rear surfaces;

drawing in succession a single planar card member at a time into a delivery mechanism;

feeding the card into a labeling station;

at the labeling station, adhering an opaque label strip onto a surface of the card;

applying a PIN code onto the opaque label strip;

applying a second label strip onto the opaque label strip and covering at least the PIN code; and applying a scratch-off layer onto the second label strip and positioned over the PIN code to obscure from viewing the PIN code.

32. A method according to claim 31, and further comprising the step of applying the second label strip together with the scratch-off layer.

33. A method according to claim 30, and further comprising the step of applying the scratch-off layer after applying the second label strip.

* * * * *

UNITED STATES PATENT AND TRADEMARK OFFICE
CERTIFICATE OF CORRECTION

PATENT NO.    : 6,561,416 B2                                                                Page 1 of 1
DATED         : May 13, 2003
INVENTOR(S)   : Kubert et al.

It is certified that error appears in the above-identified patent and that said Letters Patent is hereby corrected as shown below:

Title page,
Item [56], References Cited, FOREIGN PATENT DOCUMENTS, insert the following: -- EP    0 947 951    10/1999 --

Signed and Sealed this

Second Day of September, 2003

JAMES E. ROGAN
*Director of the United States Patent and Trademark Office*